Feb. 1, 1938. G. SYKES 2,106,921

FRUIT PACKING SEPARATOR

Filed Aug. 10, 1936

INVENTOR.
GEORGE SYKES.
By Martin P. Smith Atty

Patented Feb. 1, 1938

2,106,921

UNITED STATES PATENT OFFICE 2,106,921

FRUIT PACKING SEPARATOR

George Sykes, Los Angeles, Calif.

Application August 10, 1936, Serial No. 95,108

3 Claims. (Cl. 217—27)

My invention relates generally to the packaging and shipping of fresh fruits in containers, and more particularly to a separating element formed of thin flexible material that is placed between the tiers or layers of fruit in the containers, so that the fruit may be packed and shipped with minimum injury or deterioration, and also to minimize the time, labor and expense ordinarily involved in the packing of fruits in crates for shipment.

A further object of my invention, is to provide a fruit packing separator that will readily expand and thereby accommodate itself to the irregular contour of a layer or tier of fruit in the crate, and as a result, tending to more firmly hold the individual fruits in proper position and without injurious contact with adjacent fruits.

With the foregoing and other objects in view my invention consists in certain novel features of construction and arrangements of parts that will be hereinafter more fully described and claimed and illustrated in the accompanying drawing in which:

Figure 1:
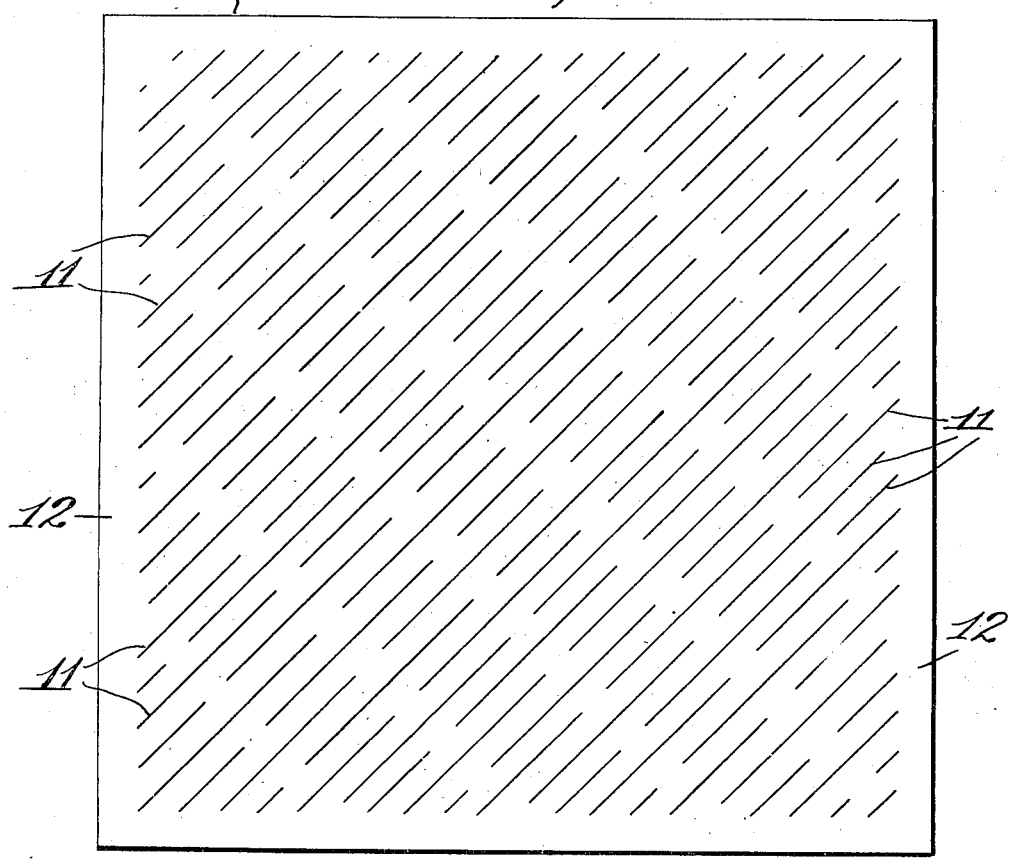
Fig. 1 is a plan view of a fruit packing separator constructed in accordance with my invention.
Figure 2:
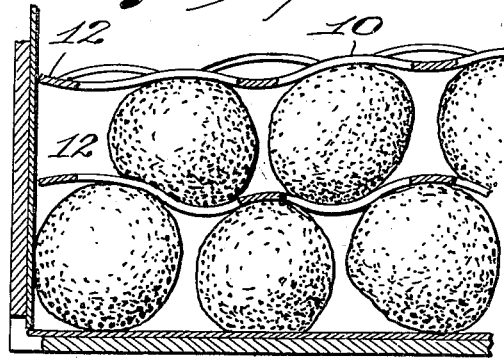
Fig. 2 is a sectional view of a portion of a shipping case with fruits of irregular shape and different sizes packed therein, and with one of my improved separators positioned between two layers or tiers of the fruit.
Figure 3:
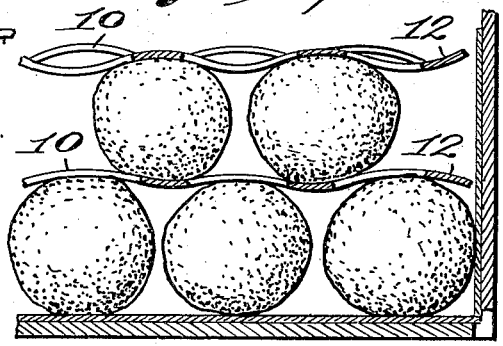
Fig. 3 is a sectional view similar to Fig. 2 and showing the separator positioned between two tiers or layers of fruit of uniform size and shape.

Referring by numerals to the accompanying drawing which illustrates a preferred embodiment of my invention, 10 designates a sheet of thin flexible material, preferably medium or heavy weight paper or light weight cardboard. This sheet is cut along lines equally spaced apart and extending diagonally of the sheet, to form a plurality of slits 11, all of which slits excepting those adjacent the edges of the sheet being of uniform length and disposed in staggered relation, thus the end portions of each slit extends beyond the ends of the slits in the next adjacent rows.

Portions 12 immediately adjacent the edges of the sheet 10 are uncut, thus forming continuous marginal strips that surround the slitted area of the sheet.

By thus slitting the sheet along diagonal lines, the sheet may expand to a certain extent in directions at right angles to the straight edges of the sheet, and the narrow strips of paper or cardboard between the slits 11 will readily flex upwardly or downwardly so as to accommodate themselves to the irregular contour of the fruits in the tiers or layers, between which the sheet is positioned.

When the separator is placed on a layer or tier of fruit in a packing case, portions of the strips between the slits 11 will bend upwardly immediately over the underlying fruits, and those portions of the strips that are positioned above the spaces between the adjacent fruits of the underlying layer or tier will bend downwardly, thereby automatically forming pockets for the reception of the fruits that are placed on top of the separator. Thus the separator, when used in the packaging of fruit, automatically adjusts itself to the irregularities of fruits of different sizes and irregular shapes, as well as to fruits that are uniform in size and shape; and as a result it is not necessary, in the packaging of the fruit, to handle each individual fruit in the formation of the tiers or layers that are packed in the shipping case.

An especially desirable feature of my improved fruit packing separator is that it is not necessary to "spot" the individual fruits as they are disposed onto the top of one of the separator sheets. Inasmuch as the sheets are formed of heavy paper or lightweight cardboard, they are readily conformable to the underlying layer of fruit and to the fruit that is placed on top of the sheet. Thus it is possible to pour a certain number of fruits onto a separator sheet as it lies upon an underlying layer of fruit and by means of the hands, the fruits are distributed in a layer on top of the supporting sheet and due to the ability of the sheet to conform to the shapes of the fruits, the packing of the successive layers of fruit may be accomplished with the expenditure of comparatively little time, labor and consequent expense as compared to the packing of fruit that must be "spotted" or disposed at certain predetermined points on the sheet and which requirement is necessary in the use of packing sheets of the type disclosed in United States Letters Patent No. 1,398,405 issued to me November 29, 1931.

By extending the rows of slits 11 from points adjacent two sides of a square or rectangular sheet of paper diagonally to points adjacent the opposite two sides of the sheet a plurality of narrow parallel strips are formed between the rows of slots, which arrangement enables the sheet to expand in opposite directions and in directions 90° apart, thus making it possible for the sheet or the narrow strips between the slits to conform to the irregularities of the underlying layer of fruit and to the supported layer of fruit.

The separator, in addition to automatically adjusting itself to the fruits that contact with the separator, serves to hold the individual fruits in fixed relation relative to each other, and consequently preventing injury of the fruit as a result of rubbing contact and pressure, while the packing cases are being shipped and handled.

While I have described my improved separator as being particularly intended for use in the packaging and shipment of fruits, it will be understood that said separator may be conveniently employed in the shipment of certain vegetables and other products that are packed in layers or tiers for shipment.

In packing fruit that is substantially uniform in size, a number of fruits may be packed simultaneously with both hands without necessitating the placing of the individual fruits, which operation involves additional time, labor and skill, for where a number of fruits are packed simultaneously, the same automatically adjust themselves in the pockets or depressions of the separator, and the same number of fruits per tier or layer may be packed as though said fruits were individually positioned while packing.

While I have shown and described my improved separator as being provided with diagonally disposed slits, it will be understood that my invention also contemplates the formation of separators wherein the slits are disposed substantially parallel with the length or width of the sheet from which the separator is formed, and that when the slits are so formed, they are disposed in staggered relation or with the end portions of the slits in one row extending beyond the ends of the slits in the adjacent rows.

Thus it will be seen that I have provided a fruit packing separator that is relatively simple in construction, inexpensive of manufacture and very effective in performing the functions for which it is intended.

It will be understood that minor changes in the size, form and construction of the various parts of my improved fruit packing separator may be made and substituted for those herein shown and described without departing from the spirit of the invention, the scope of which is set forth in the appended claims.

I claim as my invention:

1. A fruit packing separator comprising a sheet of flexible material having a continuous marginal portion and provided throughout its area within said continuous marginal portion with diagonally disposed slits arranged in substantially parallel rows which slits divide the sheet into a series of continuous narrow strips extending from points adjacent two sides of the sheet to points adjacent the other two sides of said sheet and with said slits disposed in staggered relation.

2. As a new article of manufacture, a fruit packing separator comprising a sheet of conformable material having a plurality of substantially parallel rows of slits that divide the major portion of said sheet of material into a series of narrow continuous parallel strips and the slits in said rows being disposed in staggered relation.

3. As a new article of manufacture, a fruit packing separator comprising a sheet of flexible material having a plurality of substantially parallel rows of slits, that are disposed in staggered relation and the ends of the slits of each row extending beyond the ends of the slits in the adjacent rows.

GEORGE SYKES.